United States Patent [19]

Horning et al.

[11] 3,948,853

[45] Apr. 6, 1976

[54] CHLORINATED RESIN INTENDED FOR WATER TREATMENT

[76] Inventors: Douglas Patrick Horning, 358 E. 57th Ave., Vancouver, British Columbia; Ross Elmore Robertson, 3720 Underhill Drive, Calgary, Alberta, both of Canada

[22] Filed: Sept. 21, 1973

[21] Appl. No.: 399,621

[30] Foreign Application Priority Data
Oct. 5, 1972   Canada ................................. 153360

[52] U.S. Cl. ................ 260/67.6 R; 210/62; 260/68; 260/71
[51] Int. Cl.² .......................................... C08G 12/40
[58] Field of Search .......................... 260/67.6 R, 71

[56] References Cited
UNITED STATES PATENTS

| | | | |
|---|---|---|---|
| 2,472,361 | 6/1949 | Arsem | 260/67.6 R X |
| 2,654,720 | 10/1953 | Cohen et al. | 260/71 X |
| 2,797,206 | 6/1957 | Suen et al. | 260/67.6 R |

FOREIGN PATENTS OR APPLICATIONS
849,614    8/1970    Canada

*Primary Examiner*—Howard E. Schain
*Assistant Examiner*—W. C. Danison, Jr.
*Attorney, Agent, or Firm*—Berman, Aisenberg & Platt

[57] ABSTRACT

This invention relates to a chlorinated polyamide resin useful for water purification. The resin of this invention is produced by first reacting urea or melamine or a mixture of both with paraformaldehyde and then subjecting this product to chlorination. The chlorinated resin so produced can be used for treatment of drinking water and swimming pools and represents an improvement over prior art methods.

12 Claims, No Drawings

CHLORINATED RESIN INTENDED FOR WATER TREATMENT

This invention relates to an improved chlorinated polyamide resin useful for water purification.

BACKGROUND OF THE INVENTION

As the world population continues to increase and as industries and cities continue to expand, the demand for various natural resources gives rise to a demand for improved techniques. Thus, while for some purposes, water can be used without purification, pollution and contamination from various sources renders most of the natural water supplies unsuitable for drinking supplies for humans and domestic animals. Similarly, many lakes and rivers can no longer be used safely for swimming because of pollution. Hence it has become necessary in recent years to construct more and more swimming pools for private and public use. Hence, there is an increasing need for a cheap, simple and reliable method for purifying water so that it can be safely used for such purposes.

While many municipalities pass their water-supplies through a treatment plant in which the water is purified by various methods including chlorination such plants are expensive and are not completely without disadvantages. Hence, it is often found that when water used for drinking or in swimming pools is subjected to a conventional chlorine treatment, the water source is often so highly polluted that excessive chlorination by chlorine is required. In such cases, over-chlorination is sometimes neutralised by the addition of a scavenging agent, such as sulphur dioxide. Water intended for swimming pools is usually treated with chlorine or other halogens directly and often contains a great excess of chlorine. This excess of chlorine is very irritating to the eyes of the swimmers.

DESCRIPTION OF PRIOR ART

Various attempts have been made to find an alternative method of treating water supplies which could be better controlled. Among these methods Morris Wayman in Canadian Pat. No. 849,614 issued August 18, 1970 describes a new class of chlorinated polyamides which are characterised by containing in the polymer chain at least 4 of the groups:

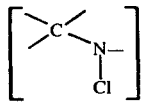

These polyamides are made by chlorinating naturally occurring polyamides such as proteins or synthetic polyamides such as nylons or urea-melamine formaldehyde resins.

Soluble chlorinated amides have long found use as a convenient means of introducing available chlorine for water treatment but none provide a convenient method of introducing low levels of chlorine over an extended period for the treatment of potable water. This is the unique characteristic of the chlorinated polyamides. In such applications, a significant residual of chlorine must be maintained in the out-flow whatever the chlorine demand of the supply and it is desirable that the polymer maintain this level for a useful period of time measured in months rather than in days. The availability of the chlorine depends on the nature of the chlorine demand. Thus certain chlorinated polyamides, specifically those described in Canadian Pat. No. 849,614 issued August 18, 1970 to Moelco Chemicals Limited, made with formaldehyde as a cross-linking agent may accommodate a chlorine demand created by the addition of sodium sulfite or sodium arsenite but fail to provide a constant low residual of chlorine to potable water for more than a few days.

Moreover, we have found that a particular problem which is associated with such chlorinated polyamides is their tendency to self-oxidation. The weakening effect of such self-oxidation is familiar in the yellowing of cottons treated with polyamide type resins and exposed to chlorine bleaches in washing processes. Similarly this is claimed to be the cause of deteriorating of untreated nylon rope used about salt water. This effect of self-oxidation is quickly self-evident when chlorinated polyamides derived from urea-formaldehyde or urea-melamine-formaldehyde are used in treating water supplies. Thus, with such chlorinated resins in water, a volume of gas (consisting of carbon dioxide, nitrogen and smaller amounts of carbon monoxide) equivalent to the volume of the chlorinated polymer may be produced in less than one day. This gas production is not only undesirable in the stated application, but represents a continuing loss of active chlorine and further appears to seal off a large proportion of the remaining chlorine, effectively removing it from utilization in water treatment.

BRIEF SUMMARY OF THE INVENTION

Thus we have discovered that this tendency to self-destruction in such systems can be reduced to a low level by two improvements: (1) by using a polyamide which has been prepared by using paraformaldehyde in place of formaldehyde; and (2) by the use of special chlorination procedures. The first innovation produces a novel and improved polymer. The second removes, prior to final chlorination, groups easily oxidised and thus produces a final product which is less susceptible to self-oxidation in the presence of water.

DESCRIPTION OF THE PREFERRED EMBODIMENTS

The use of paraformaldehyde as a cross-linking agent greatly improves the chlorine release characteristics of chlorinated polyamide resins. This improvement is evident both with respect to the level of chlorine maintained in excess of chlorine demand and with respect to the useful lifetime over which the polymer is operative (e.g. 3 months as opposed to 3 days).

In addition to the added stability against self-destruction gained through the use of paraformaldehyde as a cross-linking agent, further stability may be achieved by special methods of multiple chlorination. Thus after a preliminary chlorination at some pH between 1 and 10, and at a temperature between 0° and 100°C or higher, the chlorinated resin is induced to oxidize those easily oxidizable groups by holding for varying periods of time depending on the temperature and then rechlorinating. The process may be modified to advantage by treatment with sodium chlorite or chlorine dioxide. This oxidative stabilization is best applied where the number of active sites have been minimized by the use of paraformaldehyde as a cross-linking agent.

Urea-formaldehyde resins are formed by condensing urea with formaldehyde using a 1 to 2 fold excess of formaldehyde. The product may be represented by the formula:

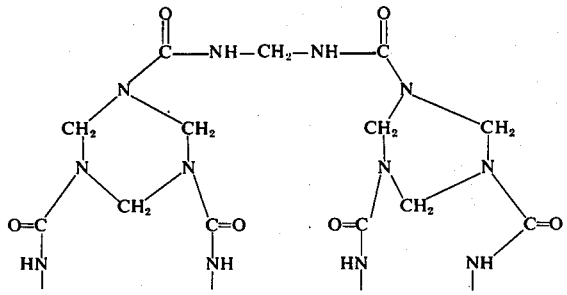

In a similar manner melamine-formaldehyde resins may be represented by the formula:

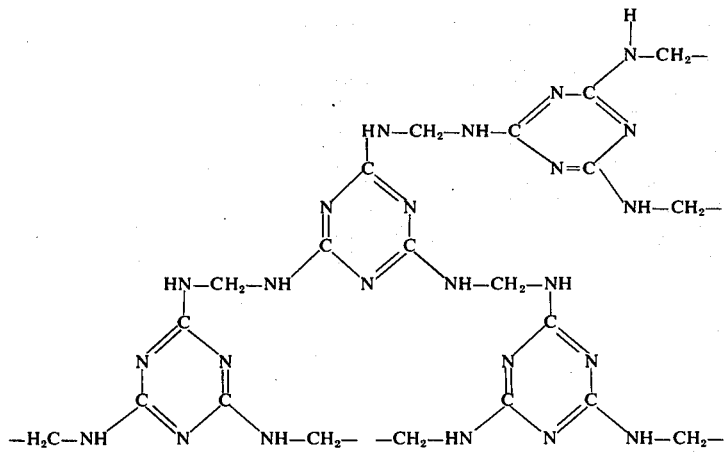

Paraformaldehyde differs from formaldehyde in that it is a polymer which may be represented by the empirical formula:

$$[-CH_2-O-]_n$$

where $n$ varies from 8–200 or even larger. The use of paraformaldehyde as a cross linking agent for the polymerization of amides avoids the production of polymers with the grouping:

$$[-NH-CH_2-NH-]$$

This grouping is susceptible to oxidation under conditions normal to the above noted application.

The urea-paraformaldehyde resins may be represented by the formula:

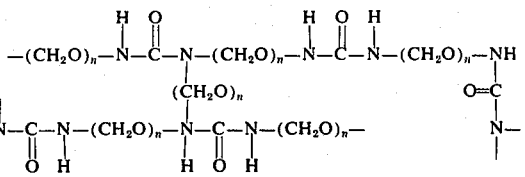

Chemically, these resins have a higher oxygen content than those derived from urea-formaldehyde. Similarly, the melamine-paraformaldehyde resin can be represented by the formula:

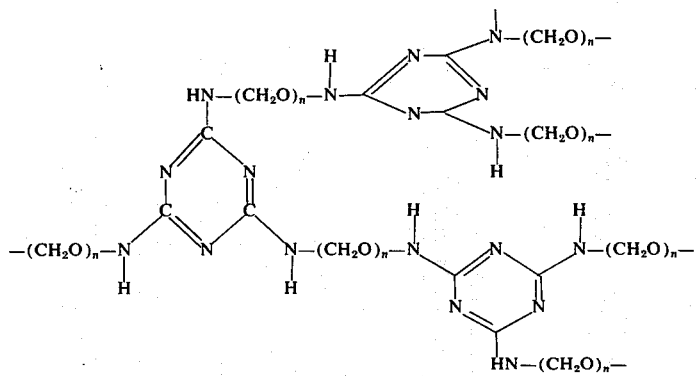

where the activated N—CH$_2$—N groups subject to facile oxidation are fewer than in a resin produced under identical conditions with formaldehyde.

Thus according to a feature of this invention there is provided a polymeric material selected from the group consisting of water-insoluble, cross-linked urea-paraformaldehyde, melamine-paraformaldehyde and urea-melamine-paraformaldehyde resins wherein at least some of the hydrogen atoms attached to nitrogen atoms have been replaced by chlorine atoms. Preferably the polymeric material is a water-insoluble cross-linked urea-paraformaldehyde or melamine-paraformaldehyde resin wherein at least some of the hydrogen atoms attached to the nitrogen atoms have been replaced by chlorine atoms wherein the chlorine content is preferably at least 1% by weight. More particularly the chlorine content of the resins is from about 10% to about 40% by weight.

According to a further feature of this invention the chlorinated resins of this invention are prepared by subjecting a corresponding urea-paraformaldehyde, melamine-paraformaldehyde or urea-melamine-paraformaldehyde resin containing no nitrogen-linked chlorine to chlorination. This chlorination is conveniently effected by passing gaseous chlorine into a suspension of the unchlorinated resin in water, at a controlled temperature. It is preferable to conduct the chlorination in the presence of acetic acid, sodium acetate, sodium carbonate or sodium hydroxide. The presence of these sodium salts enables the hydrogen chloride generated in the reaction to be removed from the solution. It is also possible to conduct the process in glacial acetic acid containing sodium acetate. When the chlorine content of the final product is above 10% by weight, then it is essential to employ an alkaline substance in the suspension so as to remove the hydrogen chloride generated. The chlorination can be conducted at a pH from 1 to at least 12, but preferably about pH 5 to 8.

As indicated above, according to a preferred feature of the process of this invention, the chlorinated resin can be further stabilized by following the direct chlorination step by treatment with a metal chlorite or chlorine dioxide. This additional step is preferably performed by treatment with sodium chlorite.

The uses of these chlorinated resins derived from the convenient form in which available chlorine can be transported and the fact that the polyamide acts as a chemical valve which releases chlorine according to the chlorine demand of water plus a small residual.

The utility of such a material in the treatment of water on the farm, in camps and summer cottages, in isolated communities, for campers, and others isolated from municipal supplies is self-evident. The chlorinated resin provides for convenient water treatment in motels, restaurants and such establishments where treated pure water is not always readily available. There are similar applications in underdeveloped countries since a simple bag of the chlorinated polymer hung in a well, cistern or water jar would sterilize the contents. The polymer can provide a convenient source of chlorine for private swimming pools.

The polymer can maintain a low concentration of chlorine in water supplies for packing plants in the food industry. It can meet the need for maintaining a low concentration of chlorine in cooling towers to avoid the growth of algae.

The polymers in unchlorinated form can be used in a variety of applications where it is desired to remove chlorine from a chlorine-rich surrounding. Stability is important in this application as well, and the greater stability of resins in which paraformaldehyde has been used as a cross-linking agent is clear both in terms of a longer useful life, and for the subsequent availability of adsorbed chlorine. The latter is particularly significant where the polymer is used to smooth out slugging of chlorine in small municipal water treatment systems.

The chlorine so absorbed will be released should the chlorine supply fall below required safety levels.

This invention is illustrated by the following Examples:

EXAMPLE 1

126 grams of melamine, 60 grams of urea, 100 grams of paraformaldehyde, 200 mls of water and 1.5 grams of sodium carbonate were combined in a resin kettle and mixed well with heating (about 80°C) until homogenous. The mixture was then cooled and acidified with dilute hydrochloric acid (55 ml of concentrated hydrochloric acid and 45 ml of water). A solid resin was formed on standing overnight and was further cured for four hours at 65°C. The resin was finished by grinding and sieving before chlorination.

100 grams of resin of 20–40 mesh was suspended in about 300 ml of water by vigorous stirring and chlorine gas was slowly bubbled through the water for three hours. The pH was maintained at 4–5 by adding calcium hydroxide as required. The washed, air-dried resin contained about 38% chlorine by weight.

EXAMPLE 2

A column was set up which contaianed four grams of the resin prepared in Example 1. Ordinary tap water was allowed to pass through the resin bed at a flow rate of about 5–10 ml per minute. The chlorine content of the eluting water quickly stabilized at about 0.10 to 0.20 p.p.m. The results are included in Table I.

TABLE I

| Volume (liters) | Chlorine Concentration (mg./l) |
|---|---|
| 50 | 0.32 |
| 100 | 0.16 |
| 150 | 0.15 |
| 200 | 0.14 |
| 250 | 0.15 |
| 300 | 0.14 |
| 350 | 0.13 |
| 400 | 0.13 |
| 450 | 0.16 |
| 500 | 0.14 |
| 550 | 0.14 |
| 600 | 0.14 |
| 650 | 0.10 |

EXAMPLE 3

For comparison, a sample of a urea-melamine-formaldehyde resin as described in Canadian Pat. No. 849,614 was chlorinated in the same manner as in Example 1. A four gram sample of the chlorinated resin containing about 40% by weight of chlorine was treated in the manner of Example 2. The results are included in Table II.

TABLE II

| Volume (liters) | Chlorine Concentration (mg./l.) |
|---|---|
| 10 | 0.60 |
| 20 | 0.25 |
| 30 | 0.09 |
| 40 | 0.06 |
| 50 | 0.02 |
| 60 | NIL |

EXAMPLE 4

The self-oxidation of chlorinated polyamide may be measured by measuring the amount of gas released at room temperature by equal weights of resins immersed in water. A comparison of the gas release rates of 1 gm samples of the resin prepared in Example 1 (a urea-melamine-paraformaldehyde resin — UMP) and a urea-melamine-formaldehyde (UMF) resin supplied by Cerco Chemicals is presented in Table III.

TABLE III

| Volume of Gas (collection tube marked in mm.) | | Time (Hours) |
|---|---|---|
| UMP | UMF | |
| 2.5 | 22 | 25 |
| 5 | 36 | 50 |
| 7.5 | 58 | 75 |
| 10.5 | | 100 |
| 20.5 | | 200 |
| 31 | | 300 |
| 41.5 | | 400 |
| 51.5 | | 500 |

EXAMPLE 5

A resin was prepared and chlorinated in the manner of Example 1. The self-oxidation reaction of the chlorinated polymer was then enhanced in two ways. Firstly by heating the resin in distilled water at 50°C for two weeks and secondly by heating the resin in distilled water at 100°C for one hour. The resins were then rechlorinated in the manner of Example 1. The stability of the resins was then measured in the manner of Example 4. The results are compared in Table IV.

TABLE IV

| Volume of Gas (mm.) | | | Time (Hours) |
|---|---|---|---|
| Resin of Example 1 | Treated 50°C | Resin 100°C | |
| 5 | 1 | 3 | 50 |
| 10.5 | 1.5 | 6 | 100 |
| 20.5 | 3 | 12 | 200 |
| 31 | 5 | 18 | 300 |
| 41.5 | 6.5 | 24 | 400 |
| 51.5 | 8.5 | | 500 |

EXAMPLE 6

A resin as prepared in Example 1 was treated by heating the chlorinated resin in water at 100°C for 1 hour. 100 gms of the resin was rechlorinated at room temperature by bubbling chlorine gas through the solution maintained at pH 4–5 by adding calcium hydroxide as required. After 3 hours the chlorine flow was stopped and one gram of sodium chlorite was added. The stirring was continued for one hour without additional pH control. The resin was then washed and tested in the manner of Example 4 for self-oxidation. This resin contained about 40% by weight of chlorine. The results are presented in Table V.

TABLE V

| Volume of Gas (mm.) | Time (Hours) |
|---|---|
| 1 | 50 |
| 2.5 | 100 |
| 4.5 | 200 |
| 7 | 300 |
| 9.5 | 400 |
| 12 | 500 |

What we claim as our invention is:

1. Solid, water-insoluble, cross-linked polymeric material, having chloro-substituted nitrogen atoms wherein the chlorine content is at least 1 percent by weight and said polymeric material being selected from the group consisting of (*a*) urea-paraformaldehyde resin, (*b*) melamine-paraformaldehyde resin and (*c*) urea-melamine-paraformaldehyde resin.

2. Chloro-substituted urea-paraformaldehyde resin according to claim 1.

3. Chloro-substituted melamine-paraformaldehyde resin according to claim 1.

4. Chloro-substituted urea-melamine-paraformaldehyde resin according to claim 1.

5. Resin according to claim 1 having a chlorine content of from about 10 percent to about 40 percent by weight.

6. Chlorine-dioxide-stabilized resin according to claim 1.

7. Chlorite-salt-stabilized resin according to claim 1.

8. Multiple-chlorination-stabilized resin according to claim 1.

9. A process for the preparation of a polymeric material as claimed in claim 1 which comprises chlorinating a corresponding urea-paraformaldehyde resin melamine-paraformaldehyde resin or urea-melamine-paraformaldehyde resin containing no nitrogen-linked chlorine.

10. A process according to claim 9 comprising chlorinating until the chlorine content of the polymeric material ranges from about 10% to about 40% by weight.

11. A process according to claim 9 comprising stabilizing the polymeric material with chlorine dioxide or a chlorite salt.

12. In the synthesis of a solid chloro-substituted water-insoluble, cross-linked amino resin, wherein the amino resin is a member selected from the group consisting of urea-aldehyde, melamine-aldehyde and urea-melamine-aldehyde, the improvement wherein the aldehyde is paraformaldehyde and chlorination is effected according to claim 9.

* * * * *